United States Patent [19]
Pardue

[11] 3,769,548
[45] Oct. 30, 1973

[54] GROUND FAULT INDICATOR
[75] Inventor: Von G. Pardue, Lawrenceville, Ga.
[73] Assignee: I-T-E Imperial Corporation, Philadelphia, Pa.
[22] Filed: May 15, 1972
[21] Appl. No.: 253,151

[52] U.S. Cl. .......... 317/18 D, 317/27 R, 317/33 SC
[51] Int. Cl. ............................................. H02h 3/28
[58] Field of Search ............ 317/18 D, 27 R, 33 SC

[56] References Cited
UNITED STATES PATENTS

| | | | |
|---|---|---|---|
| 3,662,218 | 5/1972 | Whitlow | 317/18 D |
| 3,213,321 | 10/1965 | Dalziel | 317/18 D |
| 3,407,337 | 10/1968 | Benham | 317/18 D |
| 3,512,045 | 5/1970 | Tipton | 317/18 D |
| 3,555,360 | 1/1971 | Lee | 317/18 D |
| 3,676,737 | 7/1972 | Garzon | 317/18 D |
| 3,555,359 | 1/1971 | Morris | 317/18 D |
| 3,621,334 | 11/1971 | Burns | 317/18 D |

Primary Examiner—J. D. Miller
Assistant Examiner—Harvey Fendelman
Attorney—Sidney G. Faber et al.

[57] ABSTRACT

A ground fault detector utilizes a differential transformer to detect an imbalance in load current flowing in each of the main conductors, one of which is grounded. The differential transformer secondary winding is connected to pass a bias current which produces a potential that prevents downgrading of detector performance when the grounded main conductor becomes grounded near the load. This bias current also produces a magneto-motive force to negate core losses and cause the transformer core to operate at a high permeability region on the magnetization curve.

5 Claims, 1 Drawing Figure

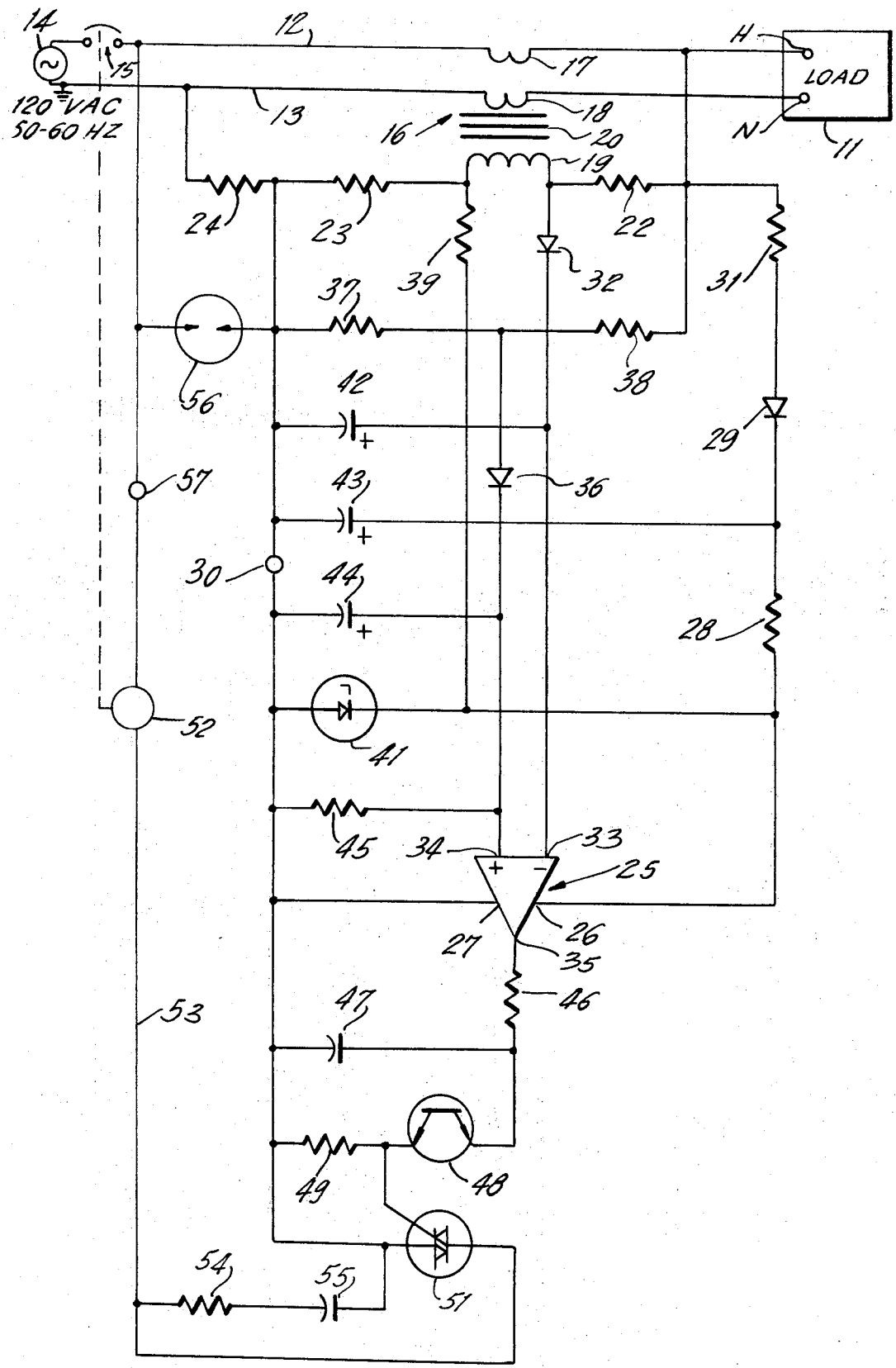

GROUND FAULT INDICATOR

For more than the past 50 years, devices for protection against abnormal electrical conditions have for the most part been constructed to protect the electrical loads and the conductors connecting these loads to the energizing source. In particular, devices for wiring and load protection have included thermal and/or magnetic device, sensitive to overload and short circuit currents, for automatically opening a circuit breaker controlling energization of the load.

More recently, the attention of the electrical industry has turned to the protection against injury and damage caused by low amplitude faults, particularly those of the type attributable to accidental high impedance grounding of the branch circuit wiring. These devices are often designated as ground fault indicators.

A typical ground fault indicator monitors current being supplied to the load by utilizing a so-called "differential transformer" which includes identical primary windings located in the branch conductors and connected so that under normal conditions the net flux generated in the transformer core by the load current will be zero. When one of the branch conductors is grounded near the source, a leakage current to a ground located between the ground fault indicator and the load causes a change in transformer flux which is detected by a multi-turn secondary winding connected to the input of an amplifier. The latter acts through a solid-state switching device to open the branch circuit breaker.

In order to detect low magnitude ground faults, the secondary of the differential transformer had to have many more turns than each of the primaries and the latter, in many practical constructions, required many turns. Because of this, the differential transformer was usually very bulky and costly. One solution to this problem of size is to provide a bias flux to overcome core losses and bring operation into a high permeability portion of the B-H curve, as shown in the U.S. application, Ser. No. 131,253, filed Apr. 5, 1971 by R. D. Garzon for a Ground Fault Detector Using Square Hysteresis Loop Reactor Core, issued July 11, 1972, as U. S. Pat. No. 3,676,737, and assigned to the assignee of the instant invention.

It has also been found that in ground fault indicators of this type, grounding of the neutral line at or near the load causes functioning of the ground fault indicator to be downgraded. Solutions to this problem are indicated in U.S. Pat. No. 3,473,091 issued Oct. 14, 1969 to A. R. Morris et al., for a Ground Leakage Differential Protective Apparatus, and U.S. Pat. No. 3,506,906 issued Apr. 14, 1970 to D. W. Nestor, for a Ground Fault Circuit Interrupter with Inadvertent Ground Senser.

Solutions to both of the aforesaid problems are provided by the instant invention, which includes means for providing a biasing current so that the core of the differential transformer is biased to a fovorable high-flux density level and the same biasing current establishes a potential in series with the neutral conductor. As explained in the aforesaid U. S. Pat. No. 3,473,091, this potential in series with the neutral conductor is such that a ground at the load end of the neutral conductor will not degrade ground fault sensitivity. By operating the core at an initial high-flux density, sensitivity is increased and relatively high signal levels are produced for operating the circuit breaker tripping switch. Because of this, extremely stable operation is obtained.

Further, the use of the same winding or windings for initial energization of the differential transformer core and the production of a potential in series with the neutral conductor obviates the need for separate magnetic cores and both functions, ground fault protection and protection against downgrading circuit performance upon the occurence of the ground at the load end of the neutral, are obtained by a minimum number of windings.

Accordingly, a primary object of the instant invention is to provide compact and less costly ground fault indicators than provided by the prior art.

Another object is to provide ground fault indicators of this type whose performance will not be downgraded when the neutral line, which is intentionally grounded at the source, is accidentally grounded at the load.

Still another object is to provide a ground fault indicator of this type in which the same magnetic core is utilized for the differential transformer, and the means protecting against downgrading of circuit performance upon grounding of the neutral near the load.

These objects, as well as other objects of this invention will become apparent after reading the following description of the accompanying drawing in which the single FIGURE is an electrical schematic of a circuit including ground fault protective means constructed in accordance with teachings of the instant invention.

Now referring to the FIGURE. Electrical load 11 is connected through main conductors 12, 13 to single phase AC source of electrical energy 14. Conductors 12 and 13 are designated as hot and neutral conductors respectively, with neutral conductor 13 being intentionally grounded adjacent to source 14. Separable contact means 15, of a conventional circuit interrupter (not shown) having thermal and magnetic overload protective means, is connected in hot conductor 12 on the source side of differential transformer 16.

The latter includes identical primary windings 17, 18 and secondary winding 19, having many more turns than either primary windings 17 or 18. All the windings 17–19 are wound about core 20. In the physical embodiment of transformer 16, core 20 is preferably a toroid. Primary windings 17, 18 are in series with the respective conductors 12, 13 and are wound so that under normal conditions, current through load 11 produces a zero net flux in core 20. One end of secondary winding 19 is connected through resistor 22 to hot conductor 12 on the load side of transformer 16, and the other end of secondary 19 is connected through the series combination of resistors 23, 14 to neutral conductor 13 on the source side of transformer 16. Thus, when circuit breaker contacts 15 are closed, current immediately flows through secondary 19 to establish an initial favorably high flux density in core 20. Thus, core 20 operates in a region of the B-H curve where permeability is high so that small flux changes will readily be detected at secondary 19.

Operational amplifier 25 includes energizing terminals 26, 27, with the latter being connected to bus 30 extending to the junction between voltage dividing resistors 23, 24. Terminal 26 is connected through the series combination of resistor 28, diode 29, and resistor 31 to hot conductor 12 on the load side of transformer 16. The junction between secondary 19 and resistor 22 is connected through diode 32 to inverting input 33 of operational amplifier 25.

The latter is of a construction similar to that designated by the Fairchild Semiconductor Division of the Fairchild Camera and Instrument Corporation as its operational amplifier μA741C shown in the Preliminary Data Sheet dated May 1968.

Non-inverting input 34 of amplifier 25 is connected through diode 36 to the junction between voltage divider resistors 37, 38 extending from bus 30 to the junction between resistors 22 and 31. The junction between secondary 19 and resistor 23 is connected through resistor 39 to amplifier terminal 26, which is connected to bus 30 through solid-state voltage regulator 41. Inverting input 33 is connected through capacitor 42 to bus 30, and non-inverting input 34 is connected to bus 30 through the parallel combination of capacitor 44 and resistor 45. The junction between resistor 28 and rectifier 29 is connected to bus 30 by capacitor 43. Breakdown element 56 is connected between busses 30 and 57.

Amplifier output 35 is connected to bus 30 by the series combination of resistor 46 and capacitor 47. The junction between elements 46, 47 is connected to bus 30 through the series combination of solid-state switch 48 and resistor 49. The junction between elements 48, 49 is connected to the control element of switch 51, which is a bi-directional solid-state power element known as a Triac. One main element of Triac 51 is connected to tripping coil 52 through bus 53, and the other main terminal is connected directly to bus 30. The series combination of resistor 54 and capacitor 55 is connected between busses 30 and 53. The other terminal of tripping coil 52 is connected through bus 57 to hot conductor 12 at a point between circuit breaker terminal 15 and transformer 16. Actuation of tripping coil 52 is effective to operate a portion of the circuit interrupter mechanism that opens contacts 15.

Rectifier 29, resistor 28, and voltage regulator 41 form a half-wave regulated DC power supply, which energizes operational amplifier 25. Resistor 31 limits the maximum voltage across capacitor 43. Resistors 23, 39 form a voltage divider to establish the DC voltage level for inverting input 33. Resistors 37, 38, 45, rectifier 36, and capacitor 44 form a voltage divider, and capacitor input half-wave bias supply for non-inverting input 34. Resistor 45 acts to insure that the voltage across capacitor 44 remains less positive than the voltage across capacitor 42 during turn-on and sudden line voltage changes.

Secondary winding 19 and resistors 22–24 form a voltage divider across conductors 12, 13. Rectifier 32 and capacitor 42 rectify and filter part of this divider output providing a DC signal to inverting input 33. The initial AC current flowing in winding 19 establishes an optimum flux density in core 20.

In a manner well known to the electronics art, operational amplifier 25 includes a comparator, which compares the signals at inputs 33 and 34. When inverting input 33 becomes negative with respect to non-inverting input 34, output 35 switches from approximately 1 volt DC to approximately 29 volts DC. When this output 35 is high, power is supplied to a relaxation oscillator comprising resistors 46, 49, capacitor 47 and solid-state switch 48. This oscillator, when energized, is free-running at approximately 5,000 Hertz. The oscillating output appears across resistor 49 and appears at the gate of Triac 51. This turns Triac 51 on to supply full-wave AC line voltage, thereby energizing trip coil 52, which opens circuit breaker contacts 15.

Overvoltage and lightning protection is provided by resistor 24 and breakdown device 56. The latter is calibrated to break down at approximately 230 volts, thereby causing line voltage in excess of 230 volts to appear across resistor 24. When an overvoltage condition is cleared, device 56 recovers and allows normal operation to continue. Resistor 54 and capacitor 55 provide protection for Triac 51 against steep voltage wave fronts that might otherwise cause false triggering and result in nuisance tripping of the mechanism for opening circuit interrupter contacts 15.

The ground fault protection circuit just described operates in the following manner. When a ground fault appears at load terminal H and more than the trip current set through adjustment of operational amplifier 25 is developed, the voltage across secondary 19 will be bucked as a result of differential transformer action. This causes the voltage at inverting input 33 of amplifier 25 to become negative with respect to non-inverting input 34, thereby producing a high output at terminal 35 to actuate relaxation oscillator 46–49, driving Triac 51 into conduction to energize trip coil 52 and open contacts 15.

In another mode of operation, a ground fault at load terminal N will effectively short primary winding 18, reducing the flux density in core 20 and reducing the bias voltage drop across secondary 19, causing tripping of circuit breaker contact 15 in the manner previously described. In this mode of operation, a higher impedance ground fault at terminal N may not cause tripping, but will effectively reduce the bias voltage drop across secondary 19, thereby increasing circuit sensitivity to a ground at load terminal H.

It is noted that if neutral conductor 13 is grounded through a low impedance on the load side of differential transformer 16, circuit breaker contacts 15 will open whether or not load 11 is connected to conductors 12, 13. Tripping under the last-noted conditions may be avoided simply by reversing the connections to input terminals 33, 34 of operational amplifier 25, reversing the connections to secondary winding 19, and adjusting the output of bias divider 37, 38 so that inverting input 33 is again initially more positive than non-inverting input 34. In this latter mode of operation, a ground fault at load terminal H is detected through differential transformer action, which causes non-inverting input 34 to go positive with respect to inverting input 33.

Thus, it is seen that the instant invention provides a novel construction for a ground fault indicator primarily by including a biasing or pre-excitation current derived directly from the protected power circuit as previously described, which raises the initial flux level in the differential transformer to a high value, wherein the differential transformer is highly sensitive to flux changes in the magnet core. As an alternative, a high frequency oscillator (not shown) may be used for coupling the biasing current to the secondary of the differential transformer. This same biasing current also provides means whereby sensitivity is not materially downgraded in the event that a ground develops on the load end of the neutral conductor. All this is accomplished by utilizing a single relatively small magnetic core.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. Circuit protective means connectable in circuit between a load and an alternating current source that are connected by first and second main conductors, with said first main conductor being grounded on the source side of said circuit protective means; said circuit protective means including a circuit interrupter having separable cooperating contacts series connected in said second main conductor; differential transformer means for monitoring and comparing current flow in said main conductors; said transformer means including a core, first and second primary windings series connected in the respective first and second main conductors and magnetically coupled to said core to produce opposing fluxes in said core derived from load currents flowing in said primary windings, and a secondary winding magnetically coupled to said core for sensing a net flux change therein produced by a difference between load currents flowing in said primary windings; operational means connected between said secondary winding and said circuit interrupter for actuating the latter to open said cooperating contacts and interrupt current flow to said load when said net flux change exceeds a predetermined limit; means coupling said secondary winding with said main conductors to produce a biasing current flowing in said secondary winding to normally establish a favorably high flux density in said core to achieve increased sensitivity to flux changes in said core, and to establish a potential in the first main conductor whereby the transformer means remains effective to monitor and compare current flow in said main conductors in the event said first main conductor becomes grounded on the load side of the transformer means; said secondary winding being an impedance element in a circuit connected to the first main conductor on the source side of one of the primary windings and connected to the second main conductor on the load side of the other of the primary windings.

2. Circuit protective means as set forth in claim 1 in which the operational means includes a signal comparitor having an input derived from the secondary winding.

3. Circuit protective means as set forth in claim 2 in which the operational means also includes an oscillator and a solid-state switch connected to said oscillator to be operated thereby for opening the cooperating contacts when said oscillator breaks into oscillation, said signal comparitor connected to said oscillator for actuation thereof when flux produced in the core by a difference between load currents flowing in the primary windings exceeds a predetermined limit.

4. Circuit protective means as set forth in claim 1 in which the operational means includes a signal comparitor having an input derived from the secondary winding.

5. Circuit protective means as set forth in claim 4 in which the operational means also includes an oscillator and a solid-state switch connected to said oscillator to be operated thereby for opening the cooperating contacts when said oscillator breaks into oscillation, said signal comparitor connected to said oscillator for actuation thereof when flux produced in the core by a difference between load currents flowing in the primary windings exceeds a predetermined limit.

* * * * *